United States Patent Office

3,244,674
Patented Apr. 5, 1966

3,244,674
S-OCTAHYDROANTHRACENE POLY ETHER-DIAL-
COHOLS, BIS CARBONATE MONOMERS AND
POLYCARBONATES
Marjan Kolobielski, Pittsburgh, Pa., assignor to United
States Steel Corporation, a corporation of Delaware
No Drawing. Filed July 24, 1962, Ser. No. 212,138
13 Claims. (Cl. 260—77.5)

This invention relates to novel and useful compounds derived from s-octahydroanthracene, having the structural formula

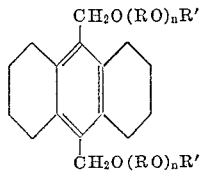

where R is chosen from the group consisting of an ethylene radical of the formula —$CH_2$—$CH_2$— and a propylene radical of the formula

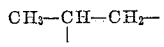

where $n$ is an integer from 1 to 4 and where R' is chosen from the group consisting of hydrogen and an alkyl radical containing from 1 to 20 carbon atoms, and to derivatives of such compounds and to novel polymer compositions of matter made from or plasticized with these compounds or their derivatives.

This application is a continuation-in-part of my application, Serial No. 118,274, filed June 20, 1961, now abandoned.

The compounds of the formula outlined above may be prepared by heating at a temperature between about 100° and 200° C. a compound of the formula HO(RO)$_n$R', where R, $n$, and R' have the significance defined above, together with 9,10-bis(chloromethyl)-s-octahydroanthracene in the presence of a hydrogen-chloride acceptor such as an alkali-metal hydroxide.

Within the genus of s-octahydroanthracene derivatives having oxygenated side chains and conforming to the above structural formula, there are two species, both having R and $n$ with the above significance. For the polyether compounds, R' may be an alkyl radical containing 1 to 20 carbon atoms whereas for the second species of polyether-dihydroxy compounds, R' is hydrogen. The polyether compounds are useful as lubricants, heat-transfer media, and plasticizers. The polyether-dihydroxy compounds and bis(carbonate) monomers thereof are starting materials for producing useful polycondensation polymers and other resin. These species will be discussed separately, as required, the polyether compounds being taken first.

Some diethers are known, such as 9,10-anthracenedimethanol dimethyl ether and 9,10-anthracenedimethanol diethyl ether, which are derived from anthracene. These ethers, however, are high-melting solid materials and are prepared from 9,10-bis(chloromethyl)-anthracene, which is a powerful skin irritant. It has now been found that polyethers derived from a partially hydrogenated anthracene such as s-octahydroanthracene have more advantageous properties. My novel polyethers of s-octahydroanthacene have the strutcural formula:

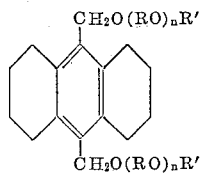

where R is chosen from the group consisting of an ethylene radical of the formula —$CH_2$—$CH_2$— and a propylene radical of the formula

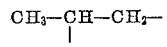

where $n$ is an integer from 1 to 4 and where R' is an alkyl radical containing from 1 to 20 carbon atoms.

In practice, the new polyethers are produced by reacting, in the presence of an alkali metal hydroxide, 9,10-bis-(chloromethyl)-s-octahydroanthracene with a hydroxy-substituted polyether having the general formula $$HO(CH_2CH_2O)_nR'$$

or HO($C_3H_6O)_n$R' where $n$ is an integer from 1 to 4 and R' is an alkyl radical containing from 1 to 20 carbon atoms. The representative hydroxy-substituted polyethers falling within this category are: ethylene- or propylene-glycol monoalkyl ether, diethylene- or dipropylene-glycol monoalkyl ether, triethylene- or tripropylene-glycol monoalkyl ether, and tetraethylene- or tetrapropylene-glycol monoalkyl ether, wherein the alkyl radical is methyl, ethyl, propyl, butyl, tridecyl, and the like.

As an illustration, the reaction with ethylene-glycol monobutyl ether takes place as follows:

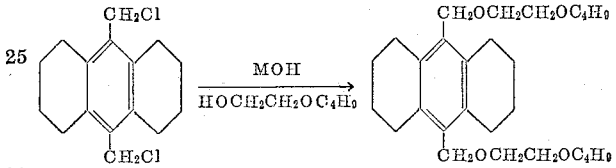

where M is a metal such as sodium or potassium.

The polyether-dihydroxy derivatives of s-octahydroanthracene and bis(carbonate) monomers thereof which constitute the second species of the present invention have the structural formula

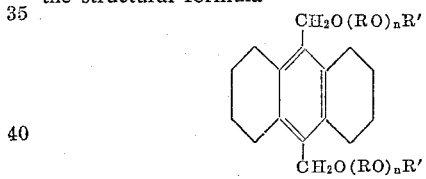

where R is chosen from the group consisting of an ethylene radical of the formula —$CH_2$—$CH_2$— and a propylene radical of the formula

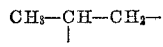

where $n$ is an integer from 1 to 4 and where R' is chosen from the group consisting of hydrogen and COOR'', where R'' is chosen from the group consisting of alkyl radicals containing from 1 to 4 carbon atoms and aryl radicals of the benzene series containing from 6 to 8 carbon atoms.

In practice, the novel polyether-dihydroxy derivatives of s-octahydroanthracene are produced by reacting 9,10-bis(chloromethyl)-s-octahydroanthracene in the presence of an alkali metal hydroxide with a glycol having the general formula HO($CH_2CH_2O)_n$H, or HO($C_3H_6O)_n$H wherein $n$ is an integer from 1 to 4. The representative glycols falling within this category are: ethylene or propylene glycol, diethylene or dipropylene glycol, triethylene or tripropylene glycol and tetraethylene or tetrapropylene glycol.

As an illustration, the reaction with ethylene glycol takes place as follows:

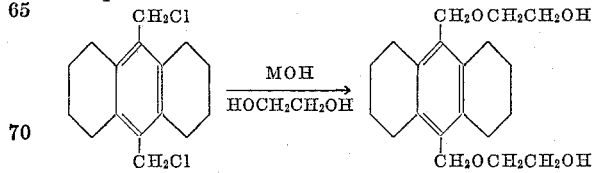

where M is a metal such as sodium or potassium.

The preferred method of producing the new polyethers or polyether-dihydroxy derivatives of s-octahydroanthracene involves the heating of the 9,10-bis(chloromethyl)-s-octahydroanthracene with the previously mentioned type of hydroxy-substituted polyether or glycol in the presence of an alkali-metal hydroxide as hydrogen-chloride acceptor and at temperatures varying from 100° to 200° C. The mixture is stirred mechanically while being heated for a period of time ranging from 1 to 4 hours. When the reaction is terminated, the polyether or polyether-dihydroxy derivative of s-octahydroanthracene can be recovered by any desired means such as, for example, by solvent extraction or by filtering off the precipitated alkali-metal chloride and then concentrating the filtrate by evaporating, under vacuum, the excess of the employed hydroxy-substituted polyether or glycol.

In practice, bis(carbonate) monomers may be prepared by condensing the above-described polyether-dihydroxy derivatives of s-octahydroanthracene with an alkyl or an aryl chlorocarbonate in the presence of pyridine. A bis(carbonate) monomer has the following formula:

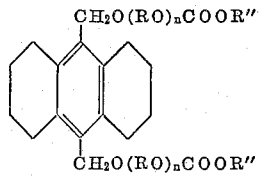

where R is chosen from the group consisting of an ethylene radical of the formula —$CH_2$—$CH_2$— and a propylene radical of the formula

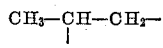

where $n$ is an integer from 1 to 4, and where R″ is chosen from the group consisting of alkyl radicals containing from 1 to 4 carbon atoms and aryl radicals of the benzene series containing from 6 to 8 carbon atoms. A representative bis(carbonate) is 9,10-bis($\beta$-hydroxyethoxymethyl)-s-octahydroanthracene-bis(ethyl carbonate), which is obtained by reacting 9,10-bis($\beta$-hydroxyethoxymethyl)-s-octahydroanthracene with ethyl chloroformate in the presence of pyridine.

The above polyether-dihydroxy compounds and bis(carbonates) due to the presence of a polyether chain therein, are useful starting materials for producing low-melting poly-condensation polymers, such as unsaturated polyesters and polycarbonates, which can be used in the manufacture of coatings, paint, or adhesives. Furthermore, such linear unsaturated polyesters are compatible and readily copolymerizable with styrene or other polymerizable monomers to yield heat-resistant thermosetting resins.

In the preparation of polyester resins, these polyether-dihydroxy compounds may be reacted with an alpha, beta-ethylenically unsaturated polycarboxylic acid. The resulting unsaturated polyesters may also contain residues of other saturated glycol components in addition to polyether-dihydroxy derivatives of s-octahydroanthracene. Such other glycol components may be ethylene glycol, diethylene glycol, triethylene glycol, tetraethylene glycol, propylene glycol, and the like. These glycol components may be used in amounts such that the unsaturated polyesters still contain at least 20 percent by weight of residues of the polyether-dihydroxy derivatives of s-octahydroanthracene. Typical alpha, beta-ethylenically unsaturated polycarboxylic acids which may be used for preparing the unsaturated polyesters according to my invention are maleic, fumaric, citraconic, itaconic, and the like acids. Whenever available, the anhydrides of these acids may be used. In addition to these unsaturated dicarboxylic acids, saturated dicarboxylic acids may also be used. Among such saturated dicarboxylic acids are phthalic, isophthalic, terephthalic, naphthalic, diphenic and the like acids. Whenever available, the anhydrides of these saturated acids may be used.

The preparation of the unsaturated polyesters is carried out by condensation of the polycarboxylic acids or their anhydrides, with dihydroxy compounds, for example, in the melt or in solution in an inert solvent. The resins resulting from the esterification reaction of the above-described components are miscible with styrene and other monomeric materials containing the polymerizable $CH_2$=C< group and may be copolymerized with styrene and other vinyl compounds to yield valuable laminating and casting resins.

In addition to the linear unsaturated polyesters described above, novel polyesters derived from carbonic acid comprising linear highly polymeric polycarbonates may be prepared from the above-described bis(carbonates).

The novel polycarbonates contain the following repeating unit:

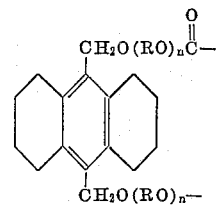

where R and $n$ have the same significance mentioned previously.

These linear polycarbonates have relatively low melting points and are useful materials for coatings, paints, or adhesives. The process for producing them comprises self-condensation of a bis(carbonate) monomer in the presence of an ester-interchange catalyst, for example, a metal alkoxide such as sodium alkoxide and titanium alkoxide or an alkali metal hydride such as sodium hydride. A catalyst which has been found particularly useful is a titanium alkoxide, specifically titanium tetrabutoxide.

An understanding of the invention may be obtained from the following typical examples of process showing how the species (1) polyether compounds are made and used.

*Example 1*

A reaction flask was charged with 71 g. of 9,10-bis(chloromethyl)-s-octahydroanthracene, 355 g. of ethylene-glycol monobutyl ether, and 39.5 g. of potassium hydroxide (85%). The mixture was stirred and heated at 120°–125° C. for 2 hours, then poured into water and extracted with ether. The ether layer was washed with water and then dried over anhydrous sodium sulfate. After elimination of the ether by distillation, the residual liquid was distilled under vacuum to give 91.7 g. (82% yield) of the 9,10-bis[($\beta$-butoxy-ethoxy)methyl]-s-octahydroanthracene; B.P. 230° to 235° C. at 0.3 mm. Hg; $n_D^{25}$=1.5163.

*Analysis.*—Calculated for $C_{28}H_{46}O_4$: C, 75.29; H, 10.38. Found: C, 75.35; H, 10.30.

The structure of the product is:

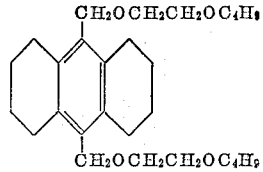

*Example 2*

A reaction flask was charged with 113.2 g. of 9,10-bis(chloromethyl)-s-octahydroanthracene, 810 g. of diethylene glycol monobutyl ether, and 60 g. of potassium hydroxide (85%). The mixture was stirred and heated at 120°–130° C. for 3.5 hours, then poured into water and extracted with ether. The ether layer was washed and then dried over anhydrous sodium sulfate. After elimination of the ether by distillation under atmospheric pressure, the residual liquid was heated up to 250° C. under a vacuum of 0.4 mm. while a slow stream of nitrogen was passed through the solution in order to remove the excess of the diethylene-glycol monobutyl ether. The residual, yellow liquid represented 196 g. (91.5% yield) of the 9,10-bis(2,5,8 - trioxadodecyl) - s - octahydroanthracene.

*Analysis.*—Calculated for $C_{32}H_{54}O_6$: C, 71.87; H, 10.18. Found: C, 71.84; H, 9.95.

The structure was further confirmed by infrared analysis, which showed the absence of C–Cl bands. The structure of the product is:

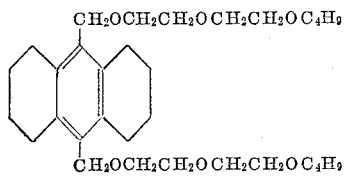

The new polyethers of s-octahydroanthracene are suitable for use as plasticizers for polyvinyl chloride. The polyethers, either alone or admixed with other plasticizers, were incorporated into plastisols, which exhibited good stability. The plastisols were made in the following manner.

A mixture consisting of:

| | Parts |
|---|---|
| "Geon 121" (polyvinyl chloride)[1] | 59 |
| Plasticizer | 39 |
| "Thermolite 31" stabilizer[2] | 2 |

[1] "Geon 121" is a trademark for polyvinyl resin.
[2] "Thermolite 31" is a trademark for a line of organotin compounds used as stabilizers for polyvinyl chloride resins.

was compounded and mixed at room temperature. The mixture was then deaerated by subjecting it to vacuum. The resultant plastisol was cured in a 6 x 6 inch pan at 350° F. for 10 minutes in a circulating-air oven. The elastomer was then molded for 10 minutes at 300° F. and 750 p.s.i. in an ASTM mold containing four 6 x 6 x 0.075 inch cavities to insure uniform thickness. Samples were cut from the sheet, conditioned by storage at a uniform temperature, and then tested for mechanical properties. Samples of elastomers were made using as plasticizers the 9,10-bis[(β-butoxyethoxy)methyl]-s-octahydroanthracene (BOM) admixed with dioctyl phthalate (1:1) and the 9,10-bis(2,5,8-trioxadodecyl)-s-octahydroanthracene (TOD) admixed with dioctyl phthalate (1:1). For comparison, the known commercial plasticizer dioctyl phthalate (DOP) was used alone and in a 3:1 mixture with n-butyl stearate (NBS). The properties of the elastomers are summarized in the following table.

TABLE I

| | Plasticizer | | | |
|---|---|---|---|---|
| | BOM plus DOP | TOD plus DOP | DOP | NBS plus DOP |
| Tensile Strength, p.s.i. | 2,724 | 2,043 | 1,874 | 1,470 |
| Elongation, percent | 430 | 490 | 486 | 326 |
| Young's Modulus, p.s.i. | 1,769 | 785 | 702 | 780 |
| Shore Durometer Hardness: | | | | |
| 0 Sec. | 92 | 76 | 68 | 71 |
| 10 Sec. | 80 | 70 | 64 | 66 |
| Clarity [1] | >15.0 | >15.0 | 37.6 | 14.9 |

[1] Percent light transmitted through sample.

A comparison of the properties of the elastomers obtained using the new polyethers of s-octahydroanthracene with dioctyl phthlate as mixed plasticizers with those obtained using n-butyl stearate with dioctyl phthalate as mixed plasticizers under the same conditions, shows the superiority of the former, especially in regard to tensile strength, modulus and hardness. It will be evident from the foregoing that my invention provides novel compounds which are secondary resin plasticizers superior to those now in use.

An understanding of the invention may be obtained from the following typical examples of process showing how the species (2) polyether-dihydroxy compounds are made and used.

*Example 3*

A reaction flask was charged with 141.5 g. (0.5 mole) of 9,10-bis(chloromethyl)-s-octahydroanthracene, 100 g. (1.5 moles) of potassium hydroxide (85%) and 1800 cc. of ethylene glycol. The mixture was stirred and heated at 125°–130° C. for four hours, then cooled and poured into six liters of water. The precipitated, colorless solid was washed with dilute hydrochloric acid, then with water, and dried to give 147 g. (88% yield) of 9,10-bis(β-hydroxyethoxymethyl)-s-octahydroanthracene. After recrystallization from ethyl acetate, the product melted at 96° to 98° C.

*Analysis.*—Calculated for $C_{20}H_{30}O_4$: C, 71.82; H, 9.04. Found: C, 71.88; H, 9.06.

The structure of the product is:

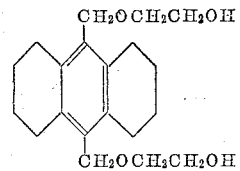

*Example 4*

A reaction flask was charged with 84.9 g. (0.3 mole) of 9,10-bis(chloromethyl)-s-octahydroanthracene, 900 g. (6.0 moles) of triethylene glycol, and 46 g. (0.7 mole) of potassium hydroxide (85%). The mixture was stirred and heated at 130°–135° C. for four hours, then cooled and poured into water. The precipitated oil was extracted with benzene, the benzene layer washed with water and the solvent stripped therefrom. The residual oil was purified by heating at 240° C. under 0.4 mm. of pressure while a slow stream of nitrogen was passed through the charge. The 9,10-bis(10-hydroxy-2,5,8-trioxadecyl)-s-octahydroanthracene was obtained in a yield of 89 percent (135.4 g.) as a light-yellow pin, $n_D^{25}=1.5420$.

*Analysis.*—Calculated for $C_{28}H_{46}O_8$: C, 65.85; H, 9.08. Found: C, 65.54; H, 9.07.

The structure of the product is:

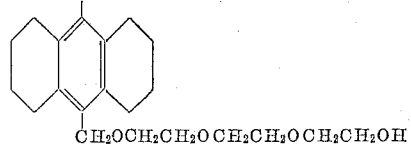

*Example 5*

An unsaturated polyester was prepared from the polyether-dihydroxy compound prepared in Example 3. A reaction flask provided with a mechanical stirrer, gas inlet tube, and Dean-Stark trap was charged with 10.02 g. (0.03 mole) of 9,10-bis(β-hydroxy-ethoxymethyl)-s-octahydroanthracene, 3.0 g. (0.0485 mole) of ethylene glycol, 6.55 g. (0.067 mole) of maleic anhydride, 0.006 g. of hydroquinone, and 5 cc. of xylene. The reaction mixture was heated at 200°–205° C. for four hours while a slow stream of dry oxygen-free nitrogen was passed through the charge. Vacuum was then applied and heating continued at 200° to 205° C. under a pressure of 0.5 mm. for an additional hour. The resulting product was a light-tan-colored resin, melting at 65° to 70° C.

A resinous composition was prepared by dissolving 60 parts of the above-prepared resin in 40 parts of styrene and adding 1 part of benzoyl peroxide. The resinous composition was poured between two glass plates that were sealed together on three edges and cured by heating at 125° F. for 11 hours, thereafter raising the temperature to 250° F. over a three-hour period and holding at 250° F. for three hours. The casting obtained was a clear, light-yellow, hard, and infusible resin. Its hardness on Rockwell scale "H" was 82.

*Example 6*

An unsaturated polyester was prepared from the polyether-dihydroxy compound prepared in Example 4. A reaction flask was charged with 20.4 g. (0.04 mole) of 9,10 - bis(10 - hydroxy - 2,5,8 - trioxadecyl) - s - octahydroanthracene, 3.3 g. (0.054 mole) of ethylene glycol, 3.9 g. (0.04 mole) of maleic anhydride, 5.9 g. (0.04 mole) of phthalic anhydride, and 0.010 g. of hydroquinone. The reaction mixture was stirred and heated at a temperature rising slowly to 139° C., with introduction of oxygen-free nitrogen. After 10 hours, the acid number of the polyester thus obtained was 40.

A resinous composition was prepared by dissolving 60 parts of the above prepared polyester in 40 parts of styrene and adding 1 part of benzoyl peroxide and 1 part of dipentene. The resinous composition was poured between two glass plates that were sealed together on three edges and cured by heating at 125° F. for 12 hours, thereafter raising the temperature to 250° F. over a three-hour period and holding at 250° F. for three hours. The casting thus obtained was a transparent, hard, and infusible resin.

*Example 7*

A reaction flask was charged with 50.1 g. (0.15 mole) of 9,10-bis(β-hydroxyethoxymethyl)-s- octahydroanthracene and 350 cc. of anhydrous pyridine. The flask was surrounded by an ice-water bath, and 48.5 g. (0.45 mole) of ethyl chloroformate was added in small portions at such a rate that the temperature was maintained at between 5° and 10° C. After the addition was complete (30 minutes), the mixture was stirred for an additional 60 minutes, then allowed to stand for 20 hours at room temperature. The reaction mixture was then poured into cold water and the slurry stirred for 15 minutes. The precipitated solid was filtered, washed with dilute hydrochloric acid, then with water, and dried to give 71.0 g. (99% yield) of colorless 9,10-bis(β-hydroxy-ethoxymethyl) - s - octahydroanthracene - bis(ethyl carbonate), melting at 73° to 75° C. After recrystallization from methanol, the product melted at 76° to 78° C.

*Analysis.*—Calculated for $C_{26}H_{38}O_8$: C, 65.25; H, 8.00. Found: C, 65.29; H, 8.19.

The structure of the product is:

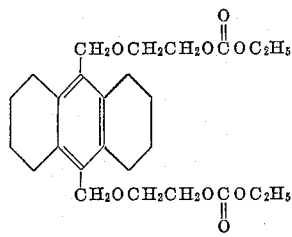

*Example 8*

A 100 cc. three-neck flask fitted with a thermometer, gas inlet tube, mechanical stirrer, and short Vigreaux column was charged with 30 g. of 9,10-bis(β-hydroxyethoxymethyl)-s-octahydroanthracene-bis(ethyl carbonate) prepared in Example 7. The product was melted by heating at 100° C. while a slow stream of dry oxygen-free nitrogen was bubbled through the charge, and then 3 drops of titanium butoxide were introduced. The temperature was raised to between 250° and 260° C. and maintained for one hour and thirty minutes. During this period, the ethyl carbonate which was formed, distilled out of the reaction flask. A vacuum was then applied, and the reaction mixture was heated with stirring under 0.3 to 0.4 mm. pressure at 255° to 265° C. for an additional hour. Upon cooling, a light-colored resin was obtained, melting at 105° to 110° C. The product was insoluble in acetone, but soluble in warm solvents such as dimethylformamide, tetrachloroethane, and phenol.

My novel polyether-dihydroxy derivatives of s-octahydroanthracene and bis(carbonate) monomers thereof are convertible respectively to useful polyester and polycarbonate resins. By preparing polycondensation polymers from dihydroxy compounds containing condensed polycyclic aromatic-cycloalkane compounds, ether linkages and long aliphatic chains, I obtain resins retaining the advantageous property of thermal stability with lower melting points. These resins are liquid at ambient temperatures or may be made liquid by mild heating or by dissolving in suitable solvents to provide valuable ingredients for lacquers, enamels, coatings and adhesives. These resins may be combined with other coating resins, film formers and pigments to provide a desired finish. The polyesters in turn may be copolymerized with styrene and other vinyl compounds to yield valuable laminating and casting resins.

Although I have disclosed herein the preferred practice of my invention, I intend to cover as well any change or modification therein which may be made without departing from the spirit and scope of the invention.

I claim:

1. As a composition of matter, a compound of the formula:

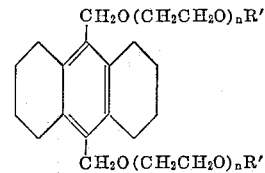

where $n$ is an integer from 1 to 4 and where R' is an alkyl radical containing from 1 to 13 carbon atoms.

2. As a composition of matter, a compound of the formula:

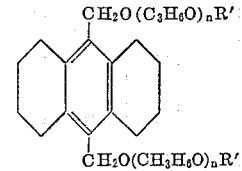

where $n$ is an integer from 1 to 4 and where R' is an alkyl radical containing from 1 to 13 carbon atoms.

3. As a composition of matter, a compound of the formula:

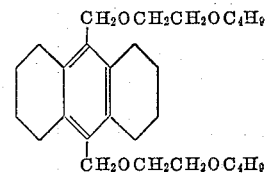

4. As a composition of matter, a compound of the formula:

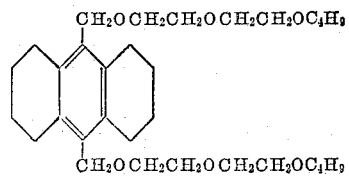

5. As a composition of matter, a compound of the formula:

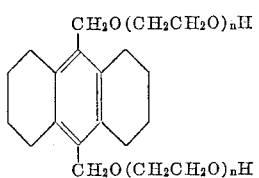

where $n$ is an integer from 1 to 4.

6. As a composition of matter, a compound of the formula:

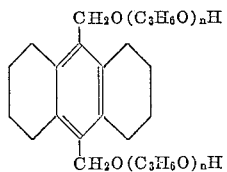

where $n$ is an integer from 1 to 4.

7. As a composition of matter, a compound of the formula:

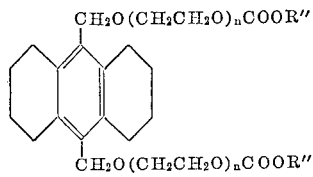

where $n$ is an integer from 1 to 4 and where $R''$ is chosen from the group consisting of alkyl radicals containing from 1 to 4 carbon atoms.

8. As a composition of matter, a compound of the formula:

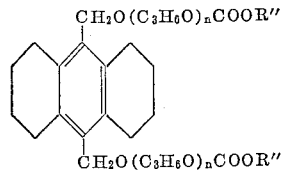

where $n$ is an integer from 1 to 4 and where $R''$ is chosen from the group consisting of alkyl radicals containing from 1 to 4 carbon atoms.

9. 9,10 - bis($\beta$ - hydroxyethoxymethyl) - s - octahydroanthracene.

10. 9,10 - bis(10 - hydroxy - 2,5,8 - trioxadecyl) - s - octahydroanthracene.

11. 9,10 - bis($\beta$ - hydroxyethoxymethyl) - s - octahydroanthracene-bis(ethyl carbonate).

12. A linear highly polymeric polycarbonate consisting of recurring groups having the formula:

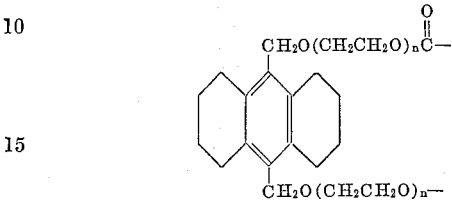

where $n$ is an integer from 1 to 4.

13. A linear highly polymeric polycarbonate consisting of recurring groups having the formula:

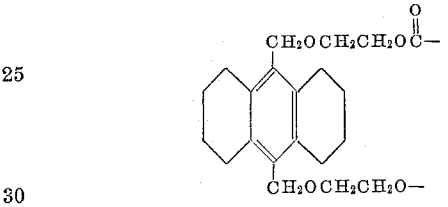

References Cited by the Examiner
UNITED STATES PATENTS

| | | | |
|---|---|---|---|
| 2,258,400 | 10/1941 | Wuertz et al. | 260—463 X |
| 2,596,091 | 5/1952 | deBenneville | 260—611 |
| 2,668,801 | 2/1954 | Schultz | 260—31.8 |
| 2,722,555 | 11/1955 | Amidon | 260—611 |
| 2,807,651 | 9/1957 | Britton et al. | 260—611 |
| 2,875,251 | 2/1959 | Rigterink | 260—611 |
| 2,885,378 | 5/1959 | Darby | 260—31.8 |
| 2,979,486 | 4/1961 | Petropoulos | 260—75 |
| 3,008,932 | 11/1961 | Wielicki et al. | 260—75 |

CHARLES B. PARKER, *Primary Examiner.*

A. H. BRODMERKEL, *Examiner.*